United States Patent [19]
Foltz

[11] 3,802,160
[45] Apr. 9, 1974

[54] AEROSOL COALESCING FILTER AND THE LIKE

[75] Inventor: Donald R. Foltz, Pittsburgh, Pa.

[73] Assignee: Hankison Corporation, Canonsburg, Pa.

[22] Filed: May 17, 1972

[21] Appl. No.: 254,207

[52] U.S. Cl. .............................................. 55/187
[51] Int. Cl. .......................................... B01d 19/00
[58] Field of Search ........................... 55/185–187, 55/DIG. 13, 25, 40, 17, 332, 333; 210/443–457, 484–497, DIG. 5

[56] References Cited
UNITED STATES PATENTS

| | | | |
|---|---|---|---|
| 3,455,459 | 7/1969 | Troy .............................. | 210/443 X |
| 3,567,619 | 3/1971 | Brown .......................... | 55/DIG. 13 |
| 2,746,607 | 5/1956 | Hess .............................. | 210/454 X |
| 3,676,987 | 7/1972 | Wunder et al. ................ | 55/DIG. 17 |
| 3,093,469 | 6/1963 | Woolston et al. ............. | 55/DIG. 25 |
| 3,080,976 | 3/1963 | Thompson et al. ............ | 210/458 X |

Primary Examiner—Samih N. Zaharna
Assistant Examiner—R. W. Burks
Attorney, Agent, or Firm—Donn J. Smith

[57] ABSTRACT

A filter structure comprises a foraminous relatively rigid support, a layer of filter material engaging said support and being coextensive therewith, and a layer of flexible foraminous material engaging a surface of the filter material opposite from the support. The flexible material is substantially coextensive with the filter material, and an arrangement is provided for pressing the flexible material into slight but uniform pressure engagement with the filter material at least during operation of the filter structure.

In another embodiment of the invention a second layer of flexible foraminous material engages a surface of the support opposite from the filter material to facilitate drainage and to minimize reintrainment.

20 Claims, 2 Drawing Figures

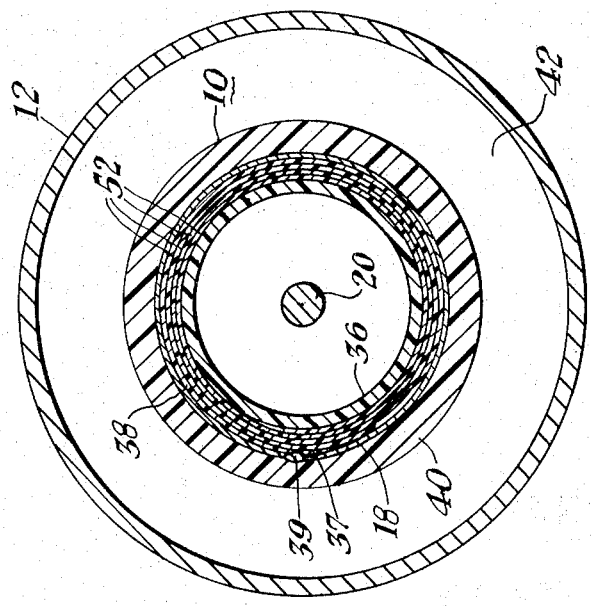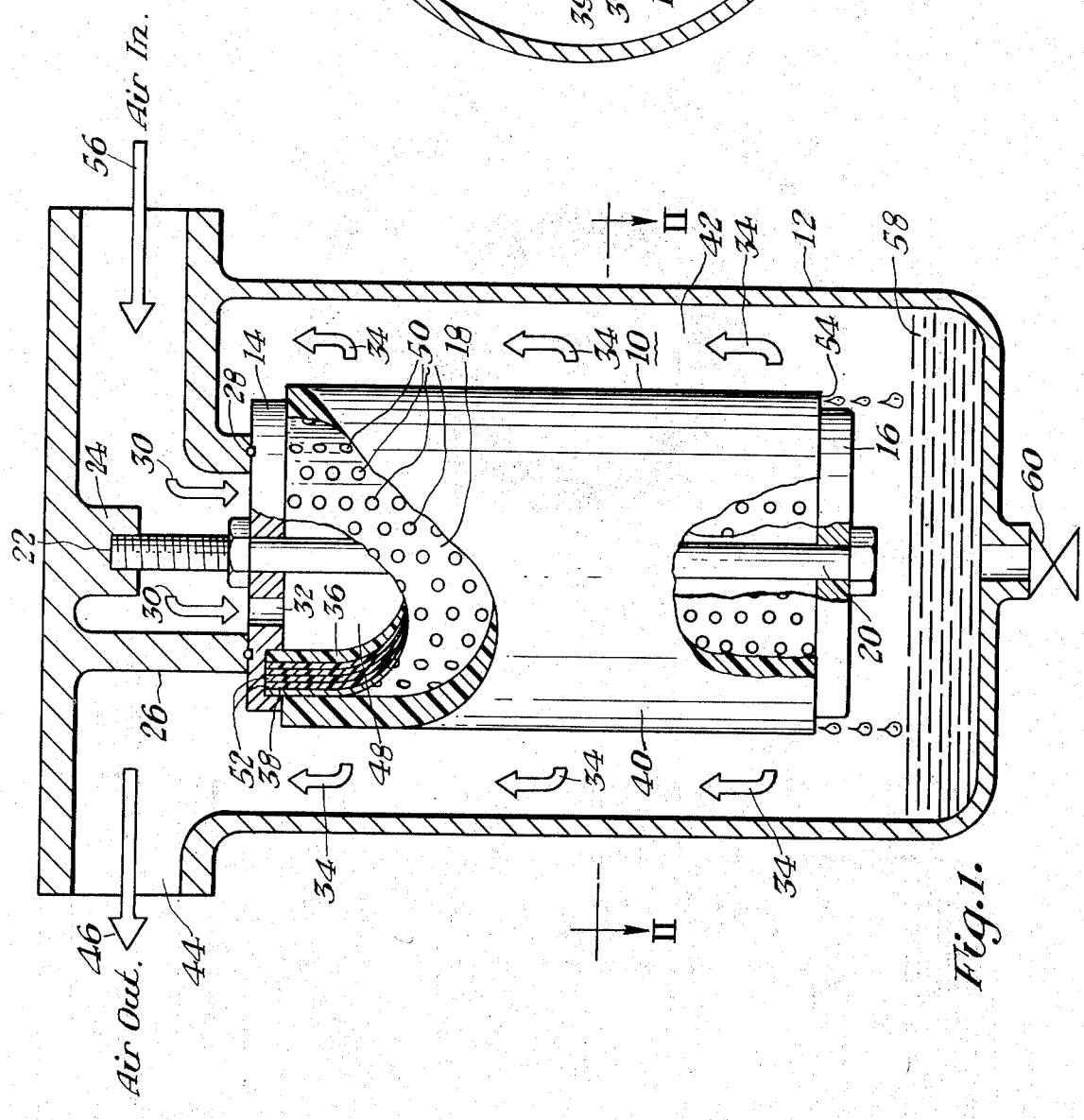

AEROSOL COALESCING FILTER AND THE LIKE

The present invention relates to filters for finely divided particles and more particularly to a filter of the character described which is capable of coalescing and removing aerosols contained in an air or gas stream or the like.

In the forthcoming description, the filter of the invention is described primarily in conjunction with removing water and/or oil aerosols from an air stream passing through the filter. However, it will be apparent that the filter can be utilized for removing other kinds of aerosols from other gaseous media that may be passed through the filter.

Previous filters designed for these purposes have suffered from one or more of the disadvantages of large numbers of component parts and attendant manufacturing difficulties, inefficient or incomplete filtration, short filtration cycle, frequent changes of filtering media and high differential pressures. In addition, a large proportion of known filters utilize a rigid or mechanical compression of the filtering material within a complicated support structure, which tends to decrease the volumetric flows and fails to provide operational stability of the filtering material.

In sharp contrast, the coalescing filter of the present invention unexpectedly provides means for quickly, efficiently and permanently removing aerosols from a stream of gaseous material such as air. The filter of the invention is provided with a single support member to promote structural simplicity and to reduce differential pressures across the filter. A unique arrangement of filtration or coalescing media is employed which do not require initial compression between rigid support members to stabilize the media. The filter is provided with an inner layer of flexible foraminous material which exerts a gentle pressure on the filtering media. This small but uniform pressure serves as dimensional stabilization and ensures structural integrity of the filtering media under varying operating conditions, such as variations in aerosol saturation and air flow. The filtering media is thus gently confined between the inner flexible layer and the single structural support and is arranged with a high ratio of voids in further mitigation of differential pressures. Thus, a stable, in-depth coalescing media is provided under a wide range of operating conditions.

Merely fastening or sandwiching filtering media between a pair of relatively rigid support members, in accordance with previous practices, and initially placing the filtering media in mechanical compression does not assure that in operation it will remain so. Variations in pressure drop, flow rate, or liquid loading can alter the dimensional stability and relative positioning of the filtering media as placed initially, with consequent reduction of overall filtration efficiency. In the present invention, provision is made to maintain on a continuous basis the dimensional stability and structural integrity of the filtering media throughout the operational life of the filter. This is accomplished by the aforementioned inner flexible layer, which is urged by the very small differential pressure generated thereacross into gentle but uniform engagement with the filtering media. Such engagement is sufficient to take up any slack in the filtering media and to fill any gaps therein. In addition, the flexible inner foraminous layer serves as a prefilter for the coalescing filter media.

Desirably another layer of flexible foraminous material is disposed on the outside of the perforated or foraminous support structure. Coalesced liquids buiding up in the aforementioned coalescing media pass through the foraminous support and into the outer flexible layer whence by gravity they drain from the filter structure. Preferably the outer layer is non-absorbent to facilitate drainage therefrom. The foraminous structure of the outer flexible layer presents a high face area to the air or gas stream, which prevents the coalesced liquid from reintraining into the filtered gas stream. The filtering or coalescing media itself is desirably applied uniformly to the support structure of the filter, as described more fully herein, such that the depth of the filtering media is uniform and free of gaps. In consequence by-passing of one or more layers or portions of the filter media and reintrainment of the coalesced material or materials is prevented.

I am aware, of course, of representative filters developed by the prior art, as typified by the U.S. patents mentioned below.

Domnick 3,460,680 (British equivalent 1,041,882) utilizes filtering material mechanically compressed between a pair of rigid supports. There is no suggestion of stabilizing the filtering media between a porous layer of flexible material, such as an open-celled foam, and a single, rigid support. Moreover, Domnick does not suggest the use of inner and outer flexible foraminous layers.

Strahl 945,632; Wuest 1,693,741; Brecque et al. 2,555,070; Bryan 3,026,609; Price 3,016,345; Wischmeyer et al. 3,434,599 and Carpenter 3,060,119 disclose various types of filters which require more or less rigid, inner and outer supports. None of these references discloses the aforementioned stabilizing arrangement of the invention, nor the use of multiple flexible layers of foraminous material.

Dornauf 3,186,551; Troy 3,455,459; Getzin 3,016,984; Kraissl 3,415,041; Bennett et al. 3,423,909; Hunter 2,537,897; Winslow 1,898,027; and Bell 830,286 utilize filtering media disposed between two more or less rigid supports. None of these patents and likewise Boltz 3,123,456; Jenson 3,290,870; Knight et al. 3,527,027 and Poelman et al. 3,034,981, disclose my novel means for stabilizing filtering media or the other novel features of my invention pointed out herein.

I accomplish the aforementioned objectives and overcome the disadvantages of the prior art by providing a filter structure comprising a foraminous relatively rigid support, a layer of filter material engaging said support and being substantially coextensive therewith, and a layer of flexible foraminous material engaging a surface of said filter material opposite from said support, said foraminous material being substantially coextensive with said filter material, and means for pressing said foraminous material into slight but uniform pressure engagement with said filter material at least during operation of said filter structure.

I also desirably provide a similar filter structure wherein said flexible material is an open-cell foamed material.

I also desirably provide a similar filter structure including a second layer of flexible foraminous material engaging a surface of said support opposite from said material.

I also desirably provide a similar filter structure including said support, said filtering material, and said flexible layer being of closely interfitting tubular configuration, said tubular filter layer having normally a smaller inner dimension than an outer dimension of said flexible tubular layer to provide said pressing means.

I also desirably provide the method of assembling a filter structure having a relatively rigid foraminous support and a flexible foraminous member juxtaposed thereto, said method comprising the steps of wrapping a strip of filtering material about a suitable mandrel or the like so that an inner dimension of the wrapping is less than an outer dimension of the flexible member, inserting the wrapping within said support, and lightly compressing said flexible member for insertion within said wrapping so that said flexible member presses uniformly against said filtering material, whereby said filtering material is restrained between said support and said flexible member in avoidance of dimensional instability during operation of said filter structure.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 1 is an elevational view, partially sectioned and partially broken away, of one form or filter arrangement according to the invention; and FIG. 2 is a cross sectional view of the apparatus as shown in FIG. 1 and taken along reference lines II—II thereof.

Referring now more particularly to the drawings, an exemplary filter structure 10 of the invention is arranged optionally as a replaceable cartridge for mounting within filter housing or canister 12. In the illustrated embodiment the filter structure 10 is cylindrical in contour, although other shapes obviously can be utilized. The filter structure 10 includes a pair of end closures 14, 16 which are separated by a relatively rigid foraminous support 18 and which are held in engagement therewith by means of mounting bolt 20. The bolt 20 passes through the interior of the filter structure 10, and desirably a threaded end portion 22 thereof is extended for threaded engagement with a tapped mounting 24 of the filter housing 12.

When thus mounted the upper end closure 14 (as viewed in FIG. 1) is seated against an inlet port structure 26 of the filter housing 12, to which the end closure 14 can be sealed by means of O-ring 28. Incoming air or other gaseous stream (arrows 30, 56) communicates with the interior of the filter structure 10 through a number of flow openings 32 in the upper end closure 14.

From the hollow interior 48 of the filter structure 10, the incoming air flows outwardly (arrows 34) through an inner layer 36 of a foraminous flexible material, for example an opencell foam material, one or more layers 38 of filtering or coalescing media, and the aforementioned support 18 which is perforated for this purpose.

Alternatively a flexible outer foraminous layer 40 which likewise can be of open-cell foam material can be disposed on the outer surface of the support 18. Thence, the outgoing air or gas flows from the annular area 42 between the filter structure 10 and the filter housing 12 to outlet port 44 (arrow 46) with which the annular space 42 communicates.

After the incoming air has entered the interior 48 of the filter structure 10 the air or other gas containing aerosols is forced into a uniform, radial flow pattern owing to the impervious character of the end closures 14, 16. A uniform distribution of the incoming air or gas throughout the coalescing media 38 is ensured by the inner foraminous layer 36. Desirably the inner layer 36 is a flexible, highly porous, open-celled foamed material. A number of foamed plastic materials can be employed for this purpose, one of which is a polyurethane foam having approximately 100 pores per linear inch and an average cell size diameter of about 150 microns. A flexible open-celled foamed material of this configuration serves admirably as an air distributor to the coalescing media 38 and also serves as a prefilter for any solid, coarse, particulate matter which might be contained in the incoming air.

Most importantly the inner layer or sleeve of foamed material 36 exerts, during operation of the filter structure 10, a gentle but uniform (as to area) pressure outwardly against the adjacent coalescing media 38 which surrounds the inner foamed layer 36. The uniform outward pressure results from the small pressure differential across the foamed layer 36 caused by this layer's very slight resistance to fluid flow (air or other gas), and is modulated, therefore, by flow and other operating conditions of the filter so that the coalescing filter media 38 is properly supported at all times during a given operating cycle. This modulated pressure can be supplemented or supplanted by my novel and unexpected method of assembly of the illustrated embodiment, wherein a length of relatively thin filtering material is wrapped one or more times about a suitably shaped mandrel (not shown) or the like. This wrapping is made sufficiently tight such that contiguous contact is attained between adjacent wrappings. The coalescing wrappings 38 which desirably have a smaller inner dimension than the outer dimension of the inner flexible layer 36, are then closely fitted within the support 18 to engage the outer surfaces of the filtering medium 38 closely with the inner support 18 surfaces. After such insertion the mandrel can be removed. The flexible inner member 36 is then lightly compressed for insertion into the wrappings 18 so that the inner member 36 exerts a slight but uniform outward pressure against the filtering medium 38. Thus the filtering or coalescing medium is restrained between the support 18 and pressing means such as that provided by the aforementioned slight compression of the flexible member 36. In effect, then, the inner foam layer 36 becomes a dimensional stabilizer for the coalescing material 38, which is backed up by the relatively rigid support 18. The structural integrity of the coalescing media 38 is assured under varying conditions of liquid saturation and air flow rate and other operational parameters.

The outer periphery of the coalescing medium 38 is supported and constrained by the support 18, also of cylindrical or tubular configuration in this example. The support 18 is perforated or is otherwise foraminous as aforesaid. For example, the support can be provided with a series of holes 50 having a diameter $x$ and located on a lattice of $2x$ triangular pitch. It will be understood of course that other relative hole size and pitch can be utilized depending upon the application of the invention. It will also be understood that the holes can be arranged in a differing lattice array (for example a square lattice), that the holes can be non-circular, and that the holes can be randomly or otherwise disposed about the surface of the support 18. In the specific embodiment as illustrated, the holes 50 are of 3/32 inch diameter on a triangular pitch of 3/16 inch.

The combination of the outward constraint afforded by the support 18 and the slight but uniform pressure exerted by the inner foam layer 36 effectively sandwiches the coalescing or filtering medium 38 to provide a stable, in-depth filtration under varying operating conditions. In contrast, the customary fastening or sandwiching of filtering media between two relatively rigid support members and placing the filtering media thereby in initial compression do not assure that in operation it will remain so. A variation in pressure drop, flow rate, or liquid loading can alter the dimensional stability and relative position of the filtering media when placed merely under initial mechanical restraint, with resulting reduction of overall filtration efficiency.

In the filtering unit 10, however, dimensional stability and structural integrity of the filtering medium 38 remain intact during operation of the filter structure 10. The slight pressure exerted by the inner foamed layer 36 is continuously applied during operation of the filter structure 10 and results from the fact that the outer face pressure of the layer 36 is less than the inner face pressure, which causes the flexible foam layer 36 to tend to expand radially outward against the surrounding filtering medium 38. This pressure differential across the inner foam layer 36 is caused by frictional energy losses of the air or other gas as it flows through the slight resistance presented by the open-cell structure of the foam layer 36. Normally, this pressure differential is both slight and uniform but sufficient to press the foam layer 36 gently against the filter media 38 and to take up any slack and fill any gaps therein or between interfaces of individual wraps, where the filtering or coalescing medium is wrapped as described herein.

The aforementioned insertion of the inner foamed sleeve 36 within the filtering medium 38 itself can provide the aforementioned slight but uniform pressure on the filter material 38, owing to the resilient character of the foam layer 36 when slightly compressed by insertion. The wrapped filter medium 38 desirably is inserted, in the illustrated example, so that its outer end 37 abuts against a longitudinal inner seam 39 of the rigid support 18 to further position and stabilize the filter medium 38. This abutment prevents movement of the outer most wrap toward the seam 39. Movement away from this seam is prevented by the winding direction of the wrapped filter medium 38. Desirably the filter material 38 is substantially coextensive with the support 18, and likewise the inner foamed layer 36 is substantially coextensive with the adjacent surfaces of the filter layer 38.

As filtration proceeds the pressure drop across the filter structure 10 increases owing to particulate matter entrapment and/or liquid loading. The attendant, somewhat higher pressure drop causes the foam layer 36 to press more firmly outwardly against the filtering medium 38. An increase in air flow rate will cause a similar effect. In this arrangement, then, the flexible inner foam layer 36 serves as an automatic adjustment, which is sensitive and responsive to changes in air flow rate, liquid loading, and operating pressures. As a result the filtering structure 10 is continually self-compensating to maintain the desired filtering media characteristics over the useful life of the filter structure 10. Thus, the filter structure 10 is unexpectedly capable of responding to varying operating conditions, in contrast to known structures, in order to compensate for such variations automatically and in such direction as to ensure an essentially constant filtration efficiency. Accordingly variations in dimensional uniformity and resultant void and discontinuities, which has plagued conventional filtering arrangement, are unexpectedly avoided along with air channeling and attendant decreases in overall filtration efficiency.

It will be understood that a variety of suitable filtering media can be employed in the filter structure 10 as the filtering or coalescing layer 38, while taking advantage of the dimensional stability afforded by the invention. In one arrangement for assembling the filter structure 10, the coalescing medium 38 can be wrapped as aforesaid to provide a number of continuous layers of a suitable filtering sheet. Suitable filtering sheet material can be obtained from Dexter Corporation, Windsor Locks, Connecticut, Grade C1801.

In the illustrated embodiment, four such layers or wraps are utilized, but it will be obvious that a differing number can be substituted depending upon a specific application of the invention. Likewise, the thickness of individual wraps 52 can be varied. In the illustrated arrangement of the invention the wrapped filtering sheet can be between about 1/40th and 1/70th inch in thickness, or preferably about 1/60th inch. The total depth or thickness of the filtering layer 38 desirably varies between about 1/10th inch and about 1/20th inch or preferably about 1/15th inch. However, as noted previously the number of filter layers and total thickness of the filtering medium 38 can be varied in dependence upon desired filtration efficiency and operating parameters for a particular application.

An exemplary form of the filtering medium 38 can be a blend of microglass fibres in a resin binder to impart dry and wet strength properties to the media and to prevent fibre migration. The fibre density, diameter, (nominally in the range of 0.5 to 0.75 microns), and depth are such that aerosols are subjected to optimum coalescense by the mechanisms of direct interception, inertial impaction and diffusion. Individual fibres of the filtering media 38 can be distributed and spatially arranged to yield a very high ratio of voids to fibres. In addition to preventing fibre migration, the resin binder also limits fibre flexure. In the specific example of the invention, fibre diameter, interstices ratio to fibres, depth of fibre bed, and fibre composition are such as to be capable of removing oil aerosols as small as 0.01 micron mean diameter, with high operating efficiencies. Where "larger" aerosols can be tolerated a lesser depth, e.g. a lesser number of layers or wraps of the aforesaid filter medium 38, can be employed. With optimum filtering conditions of gas composition, temperature, pressure, velocity, humidity, liquid particle properties and concentration of particular matter the efficiency of the filter structure 10 can approach 100 percent.

Owing to the use of the aforementioned microfibres, the total thickness of the filtering layer 38 need be only about three or four times that of the support 18, in the illustrated example where the support is fabricated from metallic structural material. Thus, in-depth filtration or coalescense of incoming aerosols is effected with a compact structure having a minimum of component parts.

The outer layer 40 of foam material can have the same composition and characteristics as the inner foam layer 36. In the illustrated arrangement the outer layer 40 is provided as a flexible sleeve of foamed material, which is fitted over the foraminous support 18. The coalesced liquids building up in the filtering media 38 are forced through the support 18 and into the outer foam layer 40, whence by gravity they drain to the base of the filter structure 10. Although cellular, the outer layer 40 desirably is a non-absorbent polyurethane material to facilitate drainage of coalesced liquids therethrough. Desirably the outer foamed layer 40 overhangs at least the lower end closure 16 of the filter structure 10, as denoted by reference numeral 54, to facilitate drippage of the coalesced liquid or liquids from the lower end portion of the outer foam layer 40.

In the illustrated example the outer foam layeer 40 can be about twice the thickness of the inner foamed layer 36, to provide the aforementioned overhanging relationship at the base 54 of the outer layer 40 and to minimize or prevent reintrainment of the collected aerosol liquid or liquids. The enlarged outer dimension of the outer foamed layer 36 further reduces local fluid escape velocity and reduces still further the possibility of reintrainment.

As the outer foam layer becomes saturated at the base of the filter structure, additional liquid drained from the upper portions of the outer foam layer 40 forces the liquid collected at the base 54 of the outer foam layer to drop therefrom as shown. Such liquid which has been coalesced from the air or gas stream flowing through the filter housing 12 (arrows 46, 56), can be collected in reservoir 58 in the bottom of the filter housing 12, whence it can be periodically drained through drain valve 60. The outer foam layer 40, being highly cellular, presents a high face area to the air stream (arrows 34) and further minimizes or prevents reintrainment of coalesced liquid into the filtered air stream.

The various components of the filter structure 10 i.e. the flexible inner foraminous layer 36, the filtering medium 38, the foraminous support 18, and the flexible outer foraminous layer 40 can be potted to the upper and lower end closures 14, 16, which can be fabricated from suitable metallic or plastic structural materials. Appropriate potting materials for ensuring an air tight seal and preventing by-passing of the several filtering components are epoxy resins, silicone rubber, and various other non-porous sealant compounds.

From the foregoing it will be seen that a novel and efficient Aerosol Coalescing Filter and the Like has been described herein. As described, the apparatus is capable of use in a wide variety of filtering applications as its size, shape, and configuration obviously can be modified. For example the several layers of the filter structure can be arranged in a planar configuration. The descriptive and illustrative materials employed herein, therefore, are utilized for purposes of exemplifying the invention and not in limitation thereof. Accordingly, numerous modifications of the invention will occur to those skilled in the art without departing from the spirit and scope of the invention. Moreover, it is to be understood that certain features of the invention can be used to advantage without a corresponding use of other features thereof.

I claim:

1. A filter structure comprising a single foraminous substantially rigid support, a layer of coalescing filter material engaging said support and being substantially coextensive therewith, and a layer of flexible foraminous material engaging that surface of said filter material opposite from said support, and flexible foraminous material being substantially coextensive with said filter material, means for pressing said flexible foraminous material into slight but uniform pressure engagement with said filter material at least during operation of said filter structure, and means for flowing a fluid to be filtered first through said flexible layer then through said filter layer then through said support so that said pressing means are modulated in accord with conditions of said fluid flow.

2. The combination according to claim 1 wherein said flexible foraminous material is an open-cell foamed material.

3. The combination according to claim 1 wherein said support and said filter material and said flexible layer are tubular, and said pressing means include a slightly oversize outer tubular dimension of said flexible layer and the resiliency thereof, said tubular flexible layer being slightly compressed within said tubular filter material.

4. The combination according to claim 1 including said filter structure being tubular and having its ends substantially closed respectively by a pair of closure members, a filter housing, and an elongated mounting bolt extending through said closures for retaining said closures on said filter structure, said bolt having a threaded extension formed thereon for engagement with a tapped mounting member in said housing.

5. The combination according to claim 1 wherein the thickness of said filter material is about three to four times that of said support.

6. The combination according to claim 1 wherein said support and said flexible foraminous material are interfitting tubular members respectively, and said filter material is a continuous sheet wrapped about said flexible member to provide said pressing means.

7. The combination according to claim 1 wherein said filter material includes microglass fibres in a resin binder having a depth in the range of about 1/10th inch to about 1/20th inch.

8. The combination according to claim 1 including a second layer of flexible foraminous material engaging that surface of said support opposite from said filter material to facilitate drainage of coalesced liquid from said filter structure.

9. The combination according to claim 3 including a pair of closure members secured respectively to each end of said foraminous support for substantially closing the end openings of said support and said filter material and said flexible layer.

10. The combination according to claim 9 including a sealant material impregnating the end portions of said support and said filter material and said flexible layer for sealing said closures thereto.

11. The combination according to claim 9 including a second flexible foraminous tubular layer surrounding said support in engagement therewith, said second layer overhanging said closure members to facilitate drippage from said second layer.

12. The combination according to claim 6 wherein said tubular support member includes an inner longitudinal seam, and an outer end of said filter material is abutted against said seam, said material being wrapped in a direction to prevent movement thereof in a direction away from said seam.

13. The combination according to claim 7 wherein said depth is about 1/15th inch.

14. The combination according to claim 7 wherein said filter material is formed from a number of discrete layers or wrappings, each having a thickness in the range of about 1/40th to about 1/70th inch.

15. A filter structure comprising a foraminous relatively rigid support, a layer of coalescing filter material engaging said support and being substantially coextensive therewith, a layer of flexible foraminous material engaging that surface of said filter material opposite from said support, said flexible foraminous material being substantially coextensive with said filter material, means for pressing said flexible foraminous material into slight but uniform pressure engagement with said filter material at least during operation of said filter structure, and a second layer of flexible foraminous material engaging that surface of said support opposite from said filter material to facilitate drainage of coalesced liquid from said filter structure and to prevent reentrainment of said coalesced liquid.

16. The combination according to claim 15 wherein said second layer is substantially coextensive with said support and is formed from an open-cell foamed material.

17. The combination according to claim 15 wherein the thickness of said second flexible layer is about twice the thickness of said first mentioned flexible layer.

18. The method of assembling a filter structure having a relatively rigid tubular foraminous support and a tubular flexible foraminous member juxtaposed thereto, said method comprising the steps of wrapping a strip of filtering material about a suitable mandrel or the like so that an inner dimension of the wrapping is less than an original or free-standing outer dimension of the flexible member, inserting the wrapping within said support, and lightly compressing said flexible member for insertion within said wrapping so that said strip becomes in effect wrapped upon said flexible member and so that said flexible member presses uniformly against said filtering material, whereby said filtering material is restrained between said support and said flexible member in avoidance of dimensional instability during operation of said filter structure.

19. The method according to claim 18 including the modified step of wrapping said filtering material several times about said mandrel.

20. A method for coalescing liquid from a fluid containing droplets or the like of said liquid, said method comprising the steps of supporting a layer of coalescing filter material against a relatively rigid foraminous support, stabilizing the other side of said filter material with a layer of flexible foraminous material, making said foraminous material and said rigid support substantially coextensive with said filter material, pressing said flexible foraminous material into slight but uniform pressure engagement with said filter material, and flowing said fluid to be filtered first through said flexible layer then through said filter layer then through said support so that said pressing step is modulated in accord with conditions of said flow.

* * * * *